United States Patent
Lai et al.

(10) Patent No.: US 10,103,564 B2
(45) Date of Patent: Oct. 16, 2018

(54) UNINTERRUPTIBLE POWER SUPPLY SYSTEM AND METHOD FOR SUPPLYING BACKUP POWER

(71) Applicants: LITE-ON ELECTRONICS (GUANGZHOU) LIMITED, Guangzhou (CN); LITE-ON TECHNOLOGY CORP., Taipei (TW)

(72) Inventors: Wei-Lieh Lai, Taipei (TW); Yu-Hsiang Lee, Taipei (TW); Chieh-Fu Hsiao, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 297 days.

(21) Appl. No.: 15/181,892

(22) Filed: Jun. 14, 2016

(65) Prior Publication Data

US 2017/0117734 A1    Apr. 27, 2017

(30) Foreign Application Priority Data

Oct. 23, 2015   (CN) .......................... 2015 1 0705088

(51) Int. Cl.
*H02J 7/00* (2006.01)
*H02J 9/06* (2006.01)

(52) U.S. Cl.
CPC ............ *H02J 7/0068* (2013.01); *H02J 9/061* (2013.01)

(58) Field of Classification Search
None
See application file for complete search history.

(56) References Cited

U.S. PATENT DOCUMENTS

| | | | | |
|---|---|---|---|---|
| 5,994,793 A | * | 11/1999 | Bobry | H02J 9/062 307/64 |
| 2009/0009005 A1 | * | 1/2009 | Luo | H02M 7/493 307/82 |
| 2009/0174260 A1 | * | 7/2009 | Wu | H02J 9/062 307/65 |
| 2011/0068630 A1 | * | 3/2011 | Okada | H02J 9/06 307/66 |
| 2015/0069842 A1 | * | 3/2015 | Niu | H02J 9/061 307/64 |

* cited by examiner

*Primary Examiner* — Jared Fureman
*Assistant Examiner* — James Evans
(74) *Attorney, Agent, or Firm* — Rosenberg, Klein & Lee

(57) ABSTRACT

A UPS system includes UPS devices and a common bus. The UPS devices are configured to output respective backup voltages. The common bus electrically interconnects the UPS devices for receiving the backup voltages, and is configured to output to the UPS devices a greatest one of the backup voltages as a dominant voltage. Each UPS device is operable to detect the backup voltage outputted thereby, to compare the backup voltage with the dominant voltage, to determine whether a power recovery signal is received from the power supply equipment, and to vary the backup voltage with a descending trend, where the varying of the backup voltage is conducted at least based on the dominant voltage and the backup voltage.

9 Claims, 6 Drawing Sheets

UNINTERRUPTIBLE POWER SUPPLY SYSTEM AND METHOD FOR SUPPLYING BACKUP POWER

CROSS-REFERENCE TO RELATED APPLICATION

This application claims priority of Chinese Patent Application No. 201510705088.1, filed on Oct. 23, 2015.

FIELD

The disclosure relates to an uninterruptible power supply system, and more particularly to an interruptible power supply system and a method for supplying backup power without voltage perturbation.

BACKGROUND

Referring to FIG. 1, a conventional uninterruptible power supply (UPS) system 1 includes an AC/DC power supply 11, and a plurality of direct-current (DC) UPS devices (e.g., the DC UPS devices 121 and 122) electrically connected to the AC/DC power supply 11 and a load 100. The AC/DC power supply 11 is configured to receive mains electricity, to convert the mains electricity (i.e., alternating-current (AC) electric power) into DC electric power, and to output the DC electric power to the load 100 via a supply bus 13. When the mains electricity is normal, the DC UPS devices 121 and 122 are charged by the DC electric power from the AC/DC power supply 11. When the mains electricity is out of order, for example, power blackout, the DC UPS devices 121 and 122 are configured to supply the load 100 with backup voltages via the supply bus 13 to ensure normal operation of the load 100 (e.g., a server system). In a case that the conventional UPS system 1 is a high-capacity UPS system, the DC UPS devices 121 and 122 are electrically connected in parallel and operate in redundant distribution mode for increasing the reliability and shortening the maintenance time. After operation of the mains electricity has been recovered, the DC UPS devices 121 and 122 stop supplying the backup voltages and are electrically disconnected from the supply bus 13, so that the AC/DC power supply 11 provides the DC electric power to the load 100.

However, voltage perturbation may occur on the supply bus 13 the instant the DC UPS devices 121 and 122 stop supplying the backup voltages. Further, referring to FIG. 2, the DC UPS devices 121 and 122 may not stop supplying the backup voltages at the desirable time, worsening the voltage perturbation on the supply bus 13 and increasing instantaneous load of the DC UPS devices 121 and 122.

SUMMARY

Therefore, an object of the disclosure is to provide an uninterruptible power supply (UPS) system that can alleviate at least one of the drawbacks of the prior arts.

According to one aspect of the disclosure, the UPS system is configured to be electrically connected to a power supply equipment and a supply bus. The supply bus is electrically connected to a load. The UPS system includes a plurality of UPS devices and a common bus. The UPS devices are configured to output respective backup voltages. The common bus electrically interconnects the UPS devices for receiving the backup voltages from the UPS devices, and is configured to output to the UPS devices a greatest one of the backup voltages as a dominant voltage. Each of the UPS devices is operable to detect the backup voltage outputted thereby, to compare the backup voltage thus detected with the dominant voltage received from the common bus, to determine whether a power recovery signal is received from the power supply equipment, and to vary the backup voltage with a generally descending trend in response to receipt of the power recovery signal, where the varying of the backup voltage is conducted at least based on the dominant voltage and the backup voltage.

According to another aspect of the disclosure, a method for supplying backup power is implemented by an uninterruptible power supply (UPS) system. The UPS system includes a plurality of UPS devices and is electrically connected to a power supply equipment. The method includes the steps of:

outputting, by the UPS devices, respective backup voltages when the power supply equipment is out of order;

receiving, by each of the UPS devices, a dominant voltage that is a greatest one of the backup voltages;

determining, by each of the UPS devices, whether a power recovery signal is received from the power supply equipment;

comparing, by each of the UPS devices, the backup voltage outputted thereby with the dominant voltage; and varying, by each of the UPS devices, the backup voltage outputted thereby with a generally descending trend when the determination made in step C) is affirmative, where the varying of the backup voltage outputted by each of the UPS devices is conducted at least based on the dominant voltage and the backup voltage.

According to another aspect of the disclosure, an uninterruptible power supply (UPS) system includes a power supply equipment, a supply bus electrically connected to a load, a plurality of UPS devices configured to output respective backup voltages, and a common bus. The common bus is electrically interconnecting the UPS devices for receiving the backup voltages from the UPS devices, and is configured to output to the UPS devices a greatest one of the backup voltages as a dominant voltage. Each of the UPS devices is operable to detect the backup voltage outputted thereby, to compare the backup voltage thus detected with the dominant voltage received from the common bus, to determine whether a power recovery signal is received from the power supply equipment, and to vary the backup voltage with a generally descending trend in response to receipt of the power recovery signal, where the varying of the backup voltage is conducted at least based on the dominant voltage and the backup voltage.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
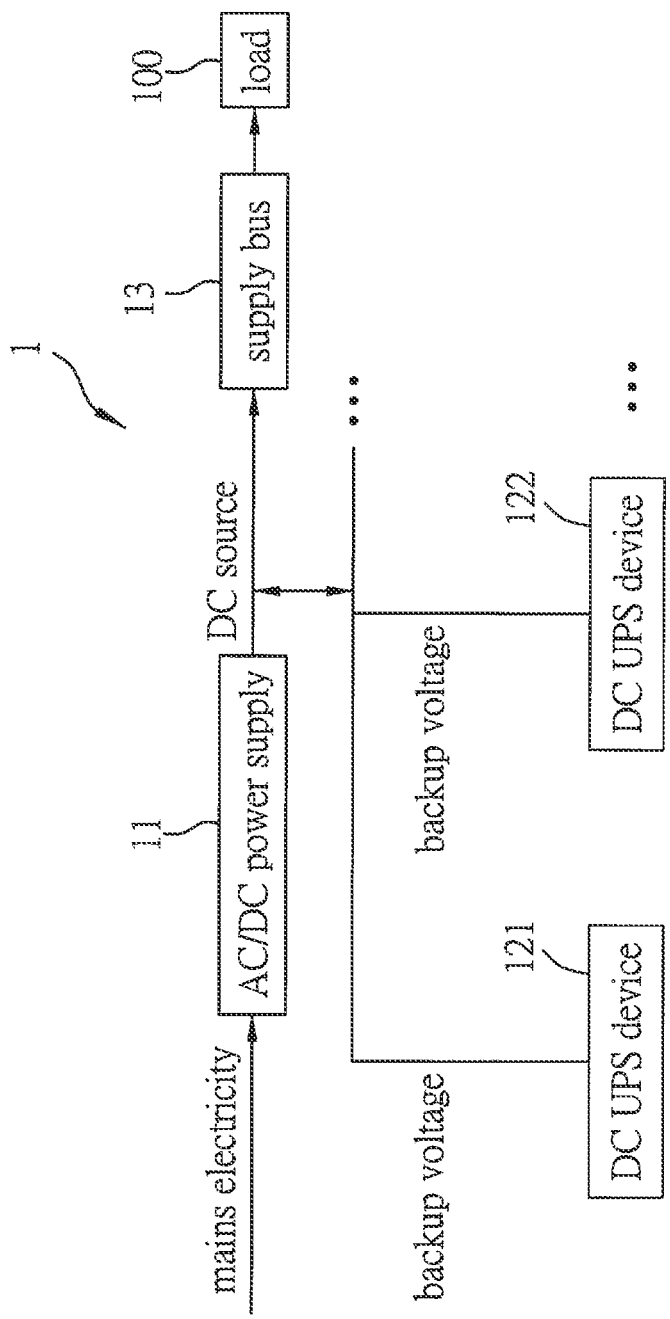
FIG. 1 is a block diagram illustrating a conventional uninterruptible power supply (UPS) system.
Figure 2:
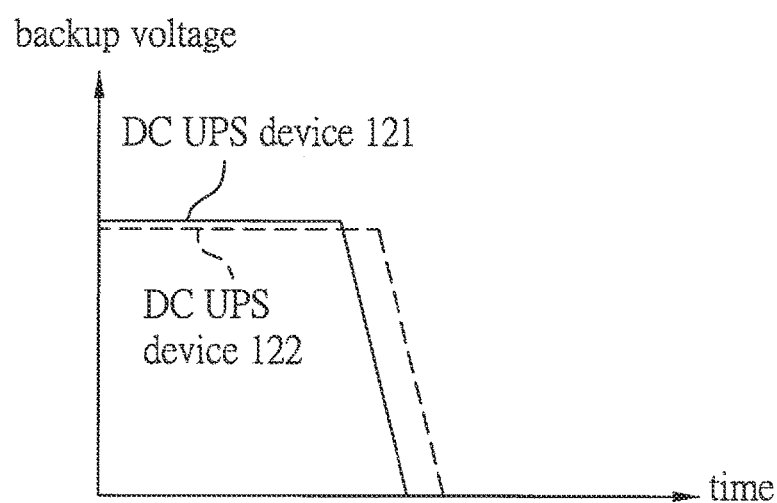
FIG. 2 is a voltage vs. time graph for illustrating UPS devices of the conventional UPS system stopping supplying backup voltages asynchronously.
Figure 3:
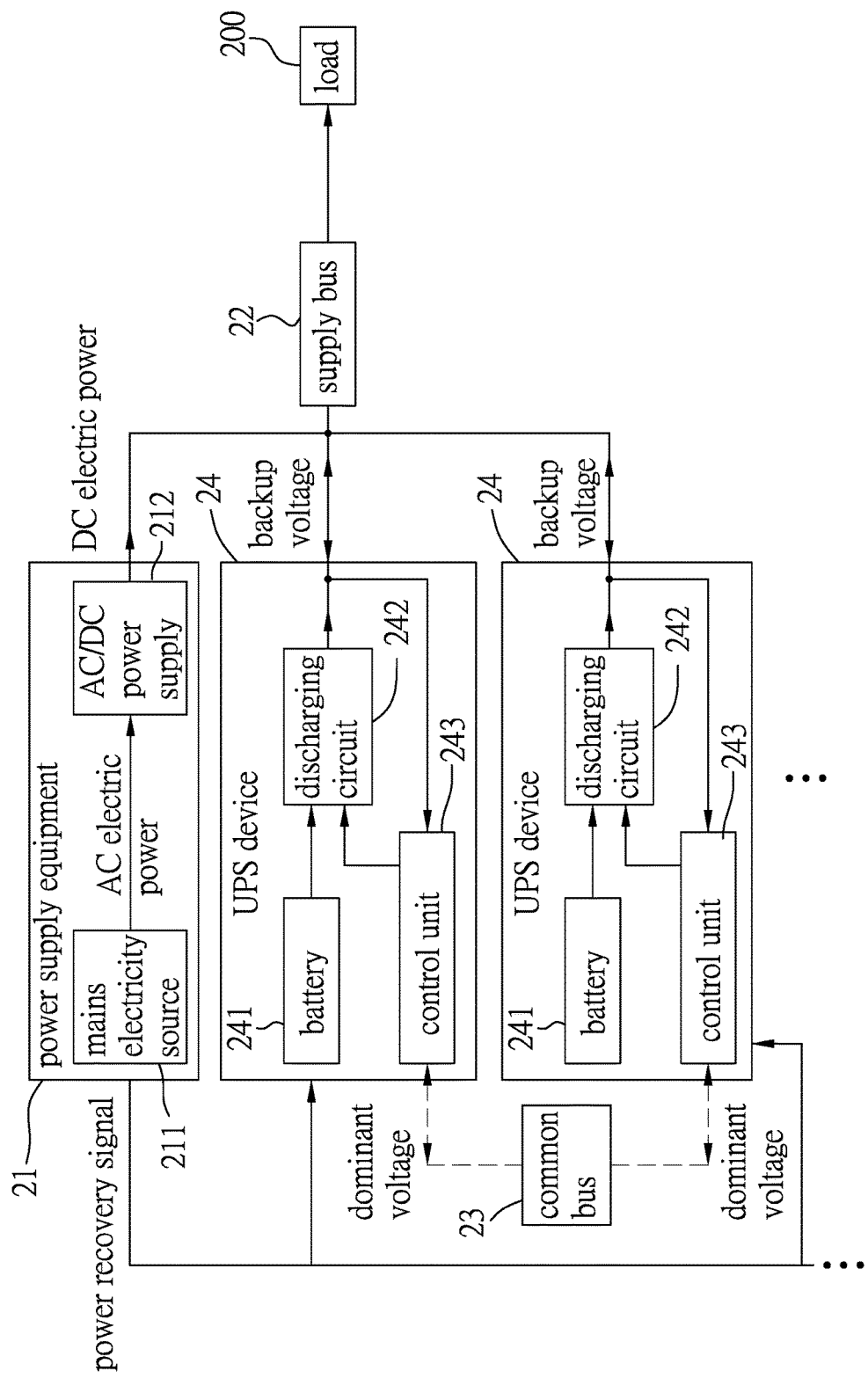
FIG. 3 is a block diagram illustrating an embodiment of the UPS system according to the disclosure.

Referring to FIG. 3, an embodiment of an uninterruptible power supply (UPS) system 2 according to this disclosure includes a power supply equipment 21, a supply bus 22 electrically connected to a load 200, a common bus 23, and a plurality of UPS devices. It should be noted that, although only two UPS devices 24 are shown in FIG. 3, the UPS system 2 may include more than two UPS devices in other embodiments.

The power supply equipment 21 is electrically connected to the load 200 via the supply bus 22, and includes a mains electricity source 211 and an AC/DC power supply 212. The mains electricity source 211 provides an alternating-current (AC) electric power, and the AC/DC power supply 212 is configured to convert the AC electric power received from the mains electricity source 211 to a direct-current (DC) electric power for supplying to the load 200 via the supply bus 22.

The UPS devices 24 and the power supply equipment 21 are electrically connected to one another in parallel. The UPS devices 24 are electrically connected to the supply bus 22, and are configured to output respective backup voltages to the supply bus 22 when the power supply equipment 21 is abnormal (e.g., out of order).

The common bus 23 electrically interconnects the UPS devices 24 for receiving the backup voltages from the UPS devices 24. The common bus 23 is configured to output to the UPS devices 24 a greatest one of the backup voltages as a dominant voltage. Each of the UPS devices 24 is operable to detect the backup voltage outputted thereby, to compare the backup voltage thus detected with the dominant voltage received from the common bus 23, and to determine whether a power recovery signal is received from the power supply equipment 21. Each of the UPS devices 24 is further operable to vary the backup voltage with a generally descending trend in response to receipt of the power recovery signal, where the varying of the backup voltage is conducted according to a comparison result between the dominant voltage and the backup voltage. As the backup voltages are varied, the greatest one of the backup voltages may change, and thus the dominant voltage may vary. The power recovery signal is outputted by the power supply equipment 21 once the power supply equipment 21 recovers from abnormality. In particular, the power supply equipment 21 is configured to output the power recovery signal when the DC electric power outputted thereby reaches a rated value.

Figure 4:
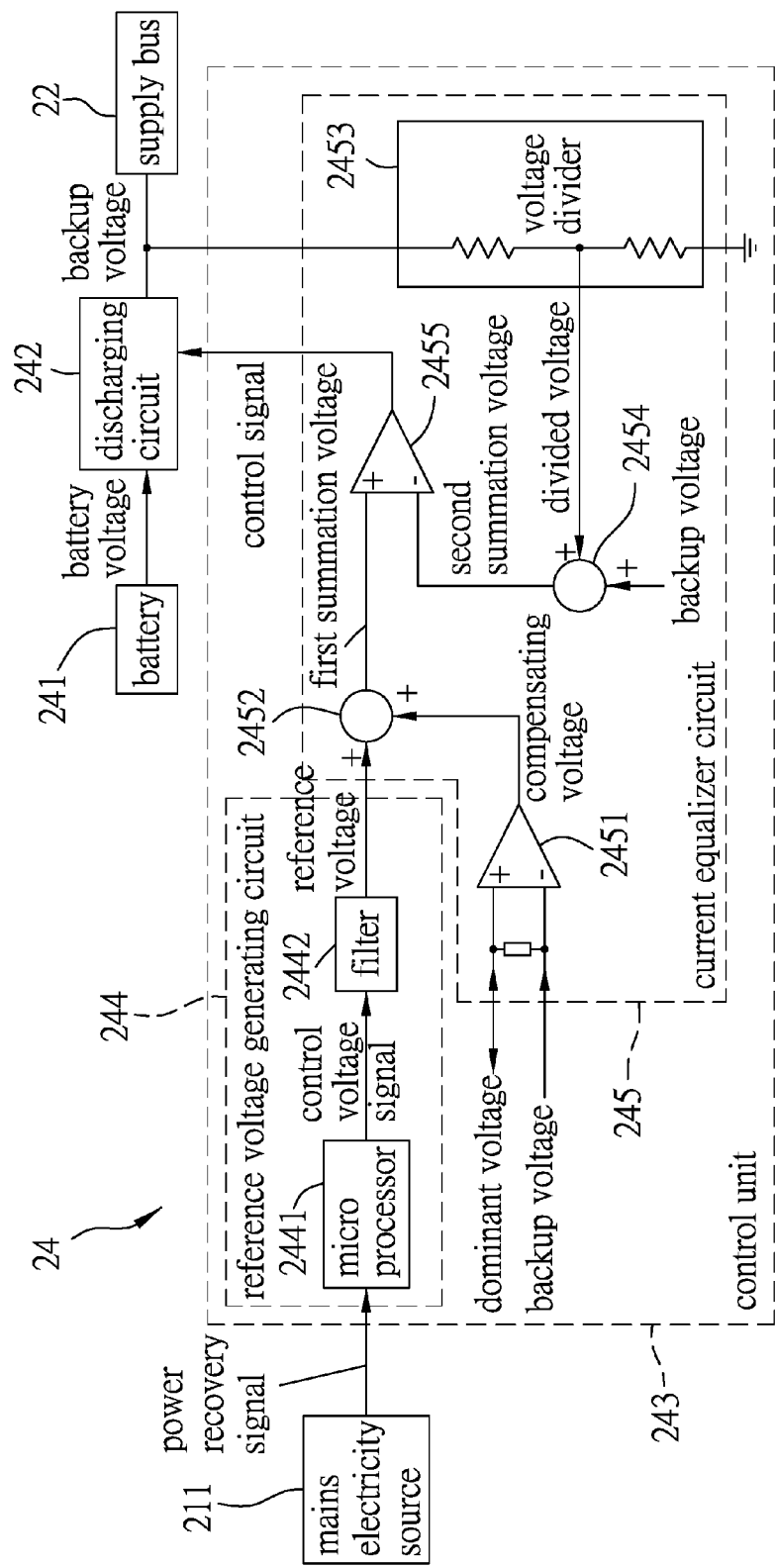
FIG. 4 is a circuit block diagram illustrating components of one of a plurality of UPS devices of the UPS system according to the disclosure.

Referring to FIGS. 3 and 4, each of the UPS device 24 includes a battery 241, a discharging circuit 242 and a control unit 243. The UPS devices 24 may have the same configuration and architecture, and only one of the UPS devices 24 will be described in detail hereinafter for the sake of brevity.

The battery 241 is configured to provide a battery voltage. In particular, the battery 241 is charged by the DC electric power from the AC/DC power supply 212 when the power supply equipment 21 operates normally, and outputs the battery voltage when the power supply equipment 21 is abnormal. The discharging circuit 242 is electrically connected to the battery 241 to receive the battery voltage therefrom, and is configured to convert the battery voltage into the backup voltage. The control unit 243 is electrically connected to the discharging circuit 242 and the common bus 23 for respectively receiving the backup voltage and the dominant voltage, and is configured to generate a control signal according to the backup voltage and the dominant voltage, and to transmit the control signal to the discharging circuit 242.

In particular, the discharging circuit 242 is configured to vary the backup voltage according to a voltage value of the control signal such that the backup voltage positively correlates to the voltage value of the control signal. The control unit 243 is further configured to determine whether the dominant voltage is greater than the backup voltage upon receiving the power recovery signal, to decrease the voltage value of the control signal when the dominant voltage is not greater than the backup voltage, and to lessen the decreasing of the voltage value of the control signal when the dominant voltage is greater than the backup voltage. In some cases, the voltage value of the control signal might even be increased slightly when the dominant voltage is greater than the backup voltage.

Referring to FIG. 4, the control unit 243 includes a reference voltage generating circuit 244 and a current equalizer circuit 245.

The reference voltage generating circuit 244 is configured to be electrically connected to the power supply equipment 21, in particular the mains electricity source 211. The reference voltage generating circuit 244 is configured to output a reference voltage with which the control signal is associated, to gradually decrease the reference voltage upon receiving the power recovery signal. A decreased amount of the backup voltage depends on a decreased amount of the reference voltage. In this embodiment, the reference voltage generating circuit 244 includes a micro processor 2441 and a filter 2442. The micro processor 2441 is configured to generate a control voltage signal with a duty cycle. For example, the micro processor 2441 uses pulse-width modulation to generate the control voltage signal in a form of a DC square wave. The filter 2442 is electrically connected to the micro processor 2441 for receiving the control voltage signal, and is configured to output the reference voltage positively related to the duty cycle of the control voltage signal. Namely, the reference voltage is in a form of a DC voltage signal, and is increased as the duty cycle of the control voltage signal is increased and is decreased as the duty cycle of the control voltage signal is decreased. The micro processor 2441 gradually decreases the duty cycle of the control voltage signal when receiving the power recovery signal, and thus the reference voltage is decreased gradually, making the backup voltage change in the generally descending trend.

The current equalizer circuit 245 is electrically connected to the reference voltage generating circuit 244 and the common bus 23 respectively for receiving the reference voltage and the dominant voltage, is electrically connected to the discharging circuit 242 for detecting the backup voltage, and is configured to generate the control signal according to the reference voltage, the dominant voltage and the backup voltage. In particular, the current equalizer circuit 245 is configured to determine whether the dominant voltage is greater than the backup voltage, and to add a compensating voltage to the reference voltage that has been decreased so as to lessen the decreasing of the voltage value of the control signal when the dominant voltage is greater than the backup voltage. Further, when the dominant voltage is not greater than the backup voltage, the current equalizer circuit 245 is configured to not add the compensating voltage to the reference voltage that has been decreased so as to decrease the voltage value of the control signal.

In this embodiment, the current equalizer circuit 245 includes a first comparator 2451, a first adder 2452, a second comparator 2455, a second adder 2454, and a voltage divider 2453. The first comparator 2451 is configured to receive the dominant voltage from the common bus 23 and the backup voltage from the discharging circuit 242, to determine whether the dominant voltage is greater than the backup voltage, to output the compensating voltage when the dominant voltage is greater than the backup voltage, and to not output the compensating voltage when the dominant voltage is not greater than the backup voltage. The first adder 2452 is configured to receive the reference voltage from the filter 2442 and the compensating voltage from the first comparator 2451, and to add the reference voltage and the compensating voltage so as to output a first summation voltage. The voltage divider 2453 includes two resistors, and is configured to receive the backup voltage from the discharging circuit 242, and to output a divided voltage related to the backup voltage. The second adder 2454 is configured to receive the backup voltage and the divided voltage, and to add the backup voltage and the divided voltage so as to output a second summation voltage. The second comparator 2455 is configured to receive the first summation voltage from the first adder 2452 and the second summation voltage from the second adder 2454, and to output the control signal based on the first summation voltage and the second summation voltage (e.g., according to a comparison between the two).

Accordingly, during the recovery of the power supply equipment 21 from abnormal failure, each of the UPS devices 24 can output the backup voltage varying in the generally descending trend, and dynamically adjust the backup voltage outputted thereby according to the control signal. As a result, the UPS devices 24 can stop outputting the backup voltages substantially at the same time, and thus, voltage perturbation can be avoided.

Figure 5:
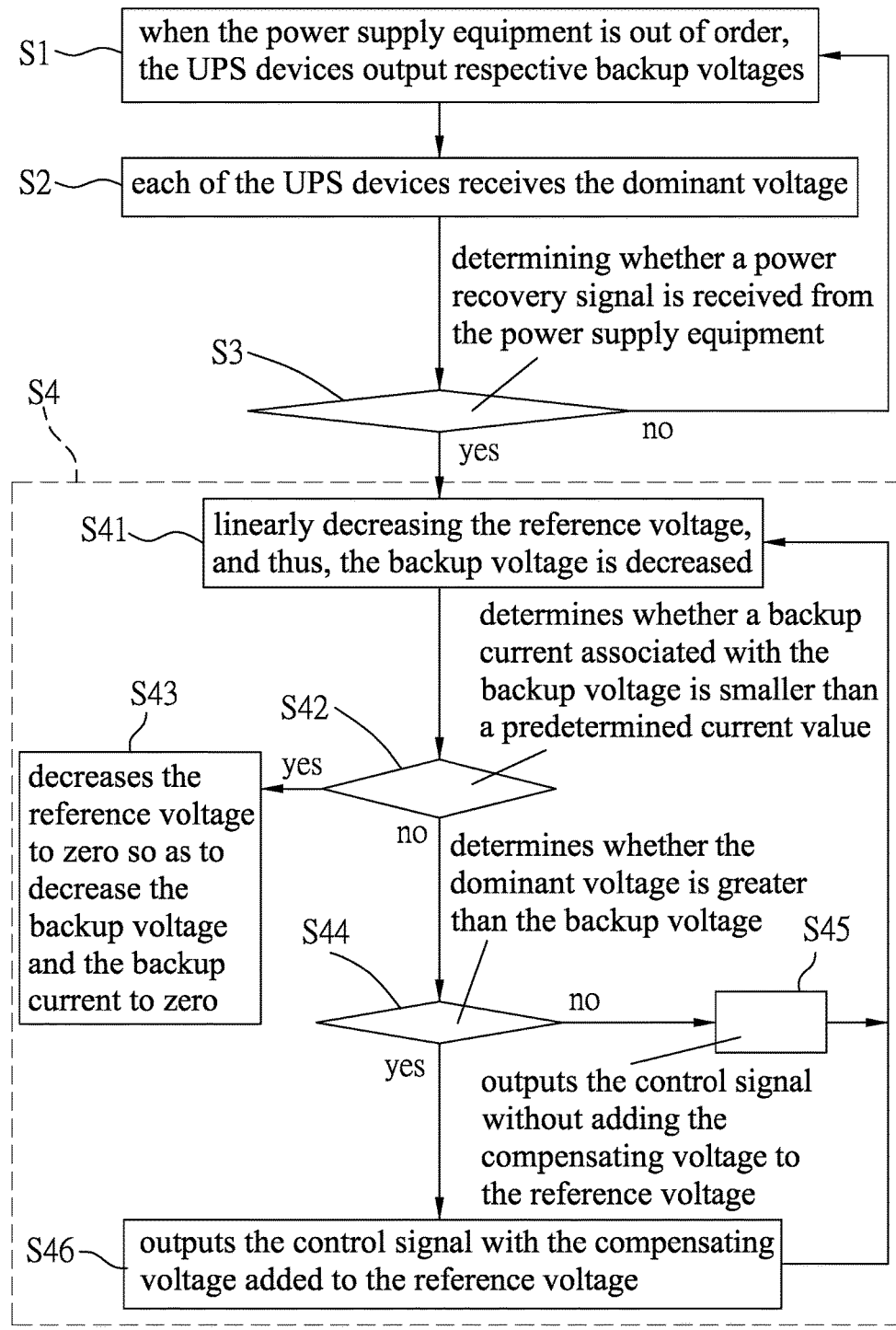
FIG. 5 is a flow diagram of a method for supplying backup power implemented by the UPS system according to an embodiment of the disclosure.

Referring to FIG. 5, a method for supplying backup power to be implemented by the UPS system 2 is described below.

When the power supply equipment 21 is out of order, the UPS devices 24 output respective backup voltages in step S1. In particular, for each of the UPS devices 24, the reference voltage generating circuit 244 generates the reference voltage, and the discharging circuit 242 outputs the backup voltage, which depends on the reference voltage, to the supply bus 22.

In step S2, each of the UPS devices 24 receives the dominant voltage that is the greatest one of the backup voltages outputted by the UPS devices 24, respectively.

In step S3, the micro processor 2441 of each of the UPS devices 24 determines whether the power recovery signal is received from the power supply equipment 21. The flow proceeds to step S4 when the determination is affirmative, and goes back to step S1 when otherwise.

In step S4, each of the UPS devices 24 varies the backup voltage outputted thereby with the generally descending trend. With the generally descending trend, while the reference voltages are gradually decreased, each of the UPS devices 24 may dynamically decrease the backup voltage according to a comparison between the dominant voltage and the backup voltage. In particular, step S4 includes the following sub-steps S41 to S45.

In sub-step S41, the reference voltage generating circuit 244 of each of the UPS devices 24 linearly decreases the reference voltage, and thus, the backup voltage is decreased by the decreased amount which depends on the decreased amount of the reference voltage. Detailed operation of the reference voltage generating circuit 244 for decreasing the reference voltage is described in the above.

In sub-step S42, each of the UPS devices 24 determines whether a backup current associated with the backup voltage outputted thereby is smaller than a predetermined current value. The flow proceeds to sub-step S43 when the determination is affirmative, and to sub-step S44 when otherwise.

In sub-step S43, the reference voltage generating circuit 244 decreases the reference voltage to zero so as to decrease the backup voltage and the backup current to zero. Accordingly, the UPS devices 24 stop providing the backup voltages to the supply bus 22.

In sub-step S44, for each of the UPS devices 24, the current equalizer circuit 245 determines whether the dominant voltage received from the common bus 23 is greater than the backup voltage outputted by the discharging circuit 242. The flow proceeds to sub-step S45 when the determination is negative, and to sub-step S46 when otherwise.

In sub-step S45, the current equalizer circuit 245 outputs the control signal to the discharging circuit 242 without adding the compensating voltage to the reference voltage, such that the discharging circuit 242 decreases the backup voltage in the descending trend with reference to the reference voltage.

In sub-step S46, the current equalizer circuit 245 outputs the control signal to the discharging circuit 242 with the compensating voltage added to the reference voltage, such that the decreasing of the backup voltage is lessened.

After sub-steps S45 and S46, the flow goes back to sub-step S41. It is noted that when the backup voltage generated by one of the UPS devices 24 is greater than the (current) dominant voltage, the backup voltage becomes the dominant voltage (for a next cycle of sub-steps S41 to S46).

Figure 6:
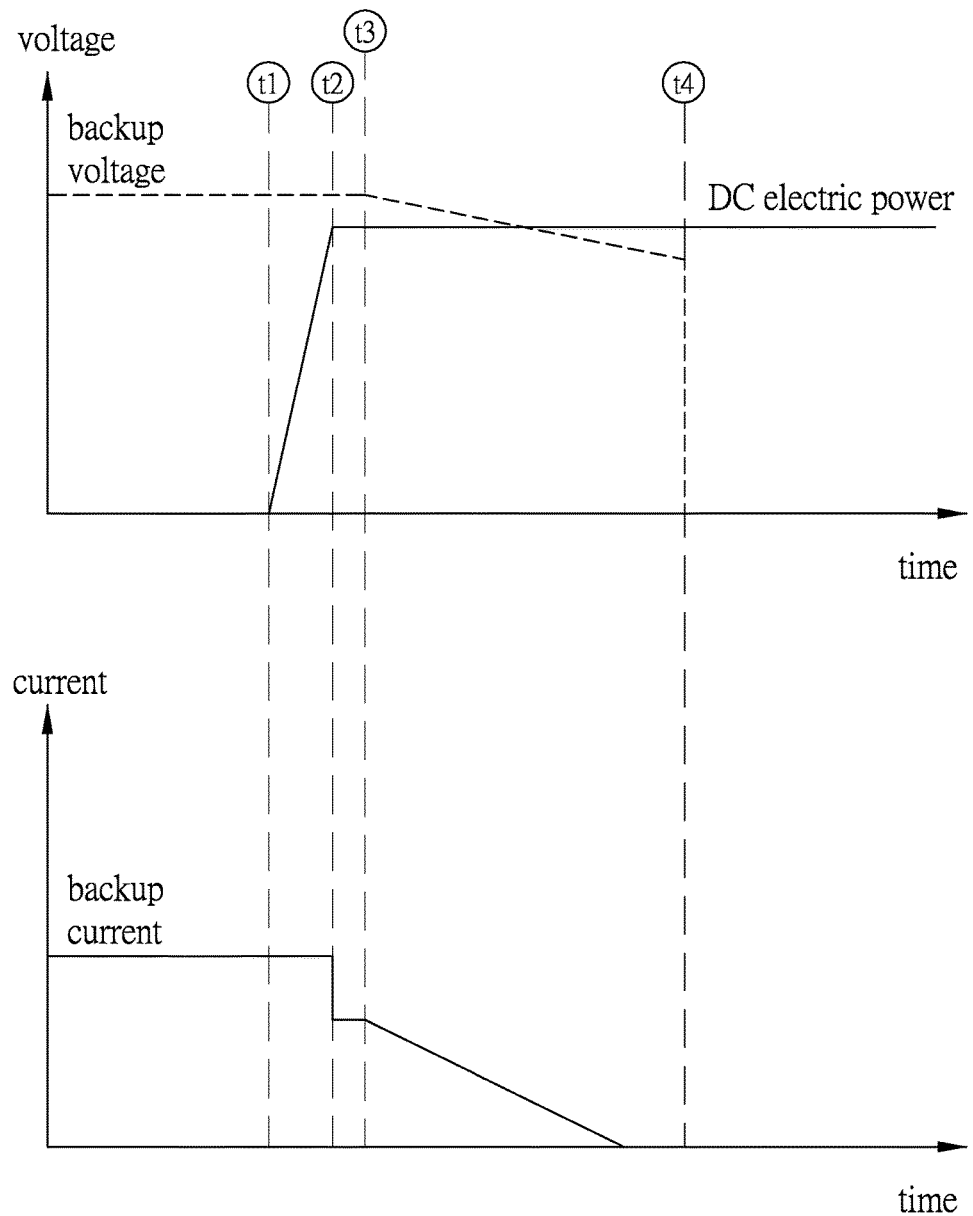
FIG. 6 is a voltage/current vs. time graph for illustrating variations in backup voltages and backup currents outputted by the UPS devices of the UPS system.

FIG. 6 shows a voltage/current vs. time graph for illustrating backup voltages outputted by the UPS devices 24. Before time point t1, the power supply equipment 21 is out of order and cannot provide the DC electric power, and thus, the UPS devices 24 output the backup voltages for supplying to the load 200 via the supply bus 22. At time point t1, the power supply equipment 21 recovers from the abnormal failure. Then, from time point t1 to time point t2, the DC electric power outputted by the power supply equipment 21 increases gradually. At time point t2, the DC electric power reaches the rated value. From time point t2 to time point t3, the UPS devices 24 and the power supply equipment 21 that are electrically connected in parallel supply electricity to the load 200 together, and thus, the backup current is decreased.

Each of the UPS devices 24 receives the power recovery signal from the power supply equipment 21 at time point t3, and varies the backup voltage with the generally descending trend from time point t3 to time point t4. In this duration, the current equalizer circuit 245 of each of the UPS devices 24 compares the dominant voltage with the backup voltage, and lessens the decreasing of the voltage value of the control signal as well as the backup voltage when the dominant voltage is greater than the backup voltage. Otherwise, the current equalizer circuit 245 decreases the voltage value of the control signal so as to decrease the backup voltage when the dominant voltage is not greater than the backup voltage. As a result, the backup voltages outputted by the UPS devices 24 are continuously and dynamically adjusted and approximated to the dominant voltage. Namely, the backup voltages are dynamically adjusted and approximated to each other.

In this way, the backup currents outputted by the UPS devices 24 are equalized, and the backup currents and the backup voltages are decreased at a stable linear rate in the generally descending trend. Further, electricity supply to the load 200 is changed stably and gradually from the UPS devices 24 to the power supply equipment 21. In addition, since the backup voltages outputted by the UPS devices 24 are dynamically adjusted and approximated to each other, variations in the backup voltages and backup currents are almost the same and coincide as shown in FIG. 6.

At time point t4, each of the UPS devices 24 determines that the backup current is smaller than the predetermined current value or is zero, and decreases the reference voltage as well as the backup voltage to zero so as to stop providing the backup voltage to the supply bus 22.

In sum, by dynamically adjusting the backup voltages to approximate the dominant voltage, the voltage perturbation attributed to asynchronous stopping of the backup voltages on the supply bus 22 can be alleviated. Thus, stability and reliability of the electricity supply to the load 200 are enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An uninterruptible power supply (UPS) system configured to be electrically connected to a power supply equipment and a supply bus that is electrically connected to a load, said UPS system comprising:
    a plurality of UPS devices configured to output respective backup voltages; and
    a common bus electrically interconnecting said UPS devices for receiving the backup voltages from said UPS devices, and being configured to output to said UPS devices a greatest one of the backup voltages as a dominant voltage,
    wherein each of said UPS devices is operable to detect the backup voltage outputted thereby, to compare the backup voltage thus detected with the dominant voltage received from said common bus, to determine whether a power recovery signal is received from the power supply equipment, to vary the backup voltage in a generally descending trend in response to receipt of the power recovery signal, where the varying of the backup voltage is conducted at least based on the dominant voltage and the backup voltage.

2. The UPS system as claimed in claim 1, wherein each of said UPS devices includes:
    a battery configured to provide a battery voltage;
    a discharging circuit electrically connected to said battery to receive the battery voltage and configured to transfer the battery voltage into the backup voltage; and
    a control unit electrically connected to said discharging circuit and said common bus for respectively receiving the backup voltage and the dominant voltage, and configured to generate a control signal at least according to the backup voltage and the dominant voltage and to transmit the control signal to said discharging circuit,
    wherein said discharging circuit is configured to vary the backup voltage according to a voltage value of the control signal such that the backup voltage positively correlates to the voltage value of the control signal,
    wherein said control unit is further configured to determine whether the dominant voltage is greater than the backup voltage upon receiving the power recovery signal, to decrease the voltage value of the control signal when the dominant voltage is not greater than the backup voltage, and to lessen the decreasing of the voltage value of the control signal when the dominant voltage is greater than the backup voltage.

3. The UPS system as claimed in claim 2, wherein said control unit includes:
    a reference voltage generating circuit configured to be electrically connected to the power supply equipment, to output a reference voltage with which the voltage value of the control signal is associated, and to gradually decrease the reference voltage upon receiving the power recovery signal, a decreased amount of the backup voltage depending at least on a decreased amount of the reference voltage when the dominant voltage is not greater than the backup voltage; and
    a current equalizer circuit electrically connected to said reference voltage generating circuit and said common bus respectively for receiving the reference voltage and the dominant voltage, electrically connected to said discharging circuit for detecting the backup voltage, and configured to generate the control signal according to the reference voltage, the dominant voltage and the backup voltage.

4. The UPS device as claimed in claim 3, wherein said reference voltage generating circuit includes:
    a micro processor configured to generate a control voltage signal with a duty cycle; and
    a filter electrically connected to said micro processor for receiving the control voltage signal, and configured to output the reference voltage related to the duty cycle of the control voltage signal.

5. The UPS system as claimed in claim 3, wherein said current equalizer circuit includes:
    a first comparator configured to receive the dominant voltage from said common bus and the backup voltage from said discharging circuit, to determine whether the dominant voltage is greater than the backup voltage, to output a compensating voltage when the dominant voltage is greater than the backup voltage, and to not output the compensating voltage when the dominant voltage is not greater than the backup voltage;
    a first adder configured to receive the reference voltage and the compensating voltage from said first comparator, and to add the reference voltage and the compensating voltage so as to output a first summation voltage;
    a voltage divider configured to receive the backup voltage, and to output a divided voltage related the backup voltage;

a second adder configured to receive the backup voltage and the divided voltage, and to add the backup voltage and the divided voltage so as to output a second summation voltage; and a second comparator configured to receive the first summation voltage from said first adder and the second summation voltage from said second adder, and to output the control signal based on the first summation voltage and the second summation voltage.

6. A method for supplying backup power to be implemented by an uninterruptible power supply (UPS) system that includes a plurality of UPS devices and that is electrically connected to a power supply equipment, the method comprising the steps of:
  A) outputting, by the UPS devices, respective backup voltages when the power supply equipment is out of order;
  B) receiving, by each of the UPS devices, a dominant voltage that is a greatest one of the backup voltages;
  C) determining, by each of the UPS devices, whether a power recovery signal is received from the power supply equipment;
  D) comparing, by each of the UPS devices, the backup voltage outputted thereby with the dominant voltage; and
  E) varying, by each of the UPS devices, the backup voltage outputted thereby with a generally descending trend when the determination made in step C) is affirmative, where the varying of the backup voltage outputted by each of the UPS devices is conducted at least based on the dominant voltage and the backup voltage.

7. The method as claimed in claim 6, further comprising the step of generating, by each of the UPS devices, a reference voltage that is associated with the backup voltage, wherein:
  step D) includes the sub-steps of determining whether a backup current associated with the backup voltage is smaller than a predetermined current value, and determining whether the dominant voltage is greater than the backup voltage when the backup current is not smaller than the predetermined current value; and
  step E) includes the sub-steps of gradually decreasing the reference voltage, decreasing the backup voltage with reference to the reference voltage when the dominant voltage is not greater than the backup voltage and a decreased amount of the backup voltage depends on a decreased amount of the reference voltage, and lessening the decreasing of the backup voltage by adding a compensating voltage to the reference voltage when the dominant voltage is greater than the backup voltage.

8. The method as claimed in claim 7, further comprising the step of:
  when the backup current is smaller than the predetermined current value, decreasing the reference voltage to zero so as to decrease the backup voltage and the backup current to zero.

9. An uninterruptible power supply (UPS) system comprising:
  a power supply equipment;
  a supply bus electrically connected to a load;
  a plurality of UPS devices configured to output respective backup voltages; and
  a common bus electrically interconnecting said UPS devices for receiving the backup voltages from said UPS devices, and being configured to output to said UPS devices a greatest one of the backup voltages as a dominant voltage,
  wherein each of said UPS devices is operable to detect the backup voltage outputted thereby, to compare the backup voltage thus detected with the dominant voltage received from said common bus, to determine whether a power recovery signal is received from said power supply equipment, and to vary the backup voltage with a generally descending trend in response to receipt of the power recovery signal, where the varying of the backup voltage is conducted at least based on the dominant voltage and the backup voltage.

* * * * *